Figure 1:
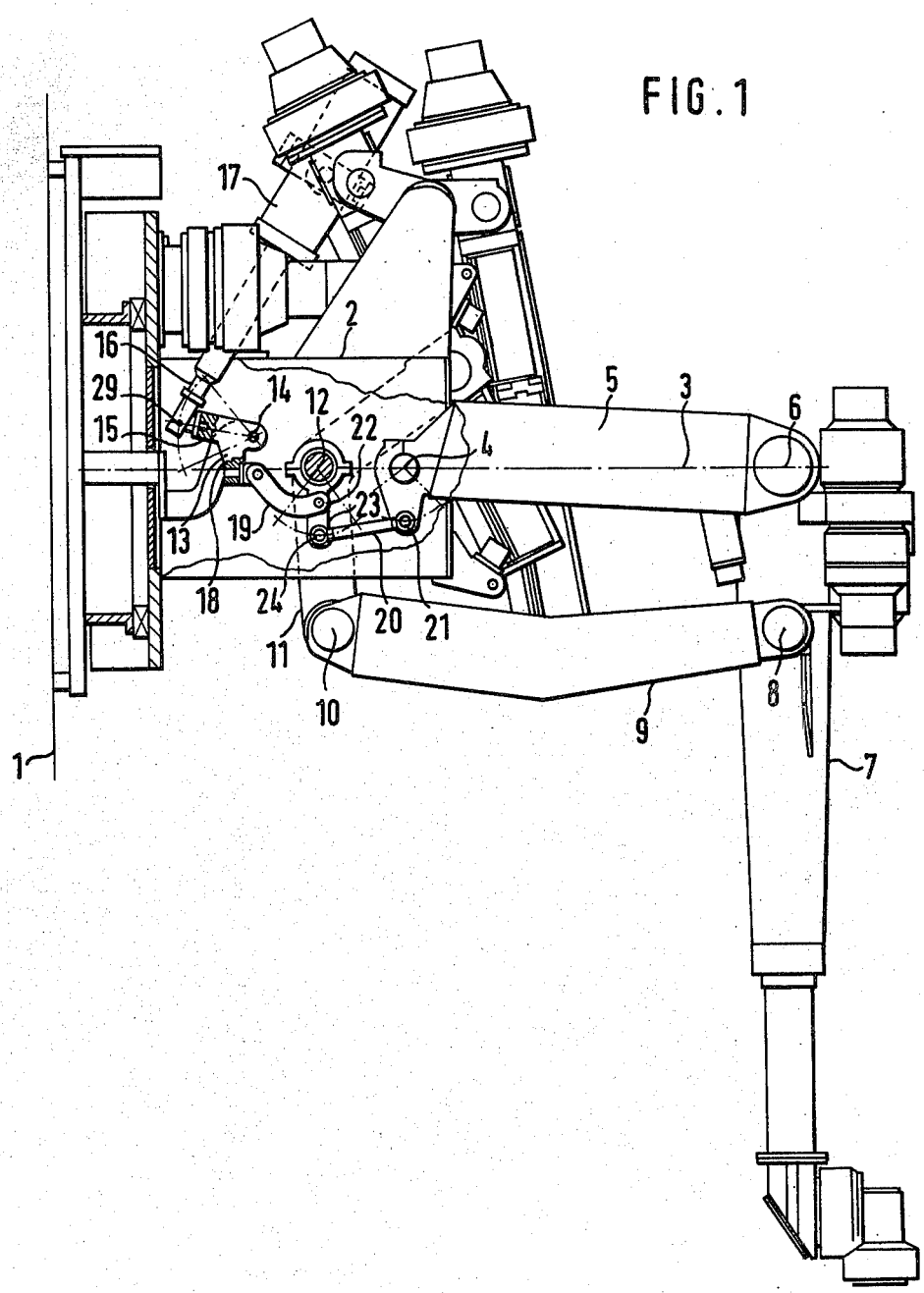

United States Patent [19]

Richter

[11] 4,455,120

[45] Jun. 19, 1984

[54] APPARATUS FOR WEIGHT BALANCING AN INDUSTRIAL ROBOT

[75] Inventor: Hans Richter, Augsburg, Fed. Rep. of Germany

[73] Assignee: Gesellschaft fur digitale Automation mbH, Munich, Fed. Rep. of Germany

[21] Appl. No.: 351,693

[22] Filed: Feb. 24, 1982

[30] Foreign Application Priority Data

Feb. 25, 1981 [DE] Fed. Rep. of Germany ....... 3107013

[51] Int. Cl.³ .............................................. B25J 11/00
[52] U.S. Cl. ....................................... 414/719; 414/1; 414/917
[58] Field of Search .................... 414/1, 4, 5, 719, 917, 414/730; 248/280.1, 281.1, 123.1, 325

[56] References Cited

U.S. PATENT DOCUMENTS

| | | | |
|---|---|---|---|
| 3,031,090 | 4/1962 | Stephenson | 414/1 |
| 3,601,260 | 8/1971 | LeGuennec | 414/1 X |
| 3,664,517 | 5/1972 | Germond et al. | 414/1 X |
| 3,883,105 | 5/1975 | Matsumoto | 414/917 X |
| 3,923,166 | 12/1975 | Fletcher et al. | 414/4 |

FOREIGN PATENT DOCUMENTS

| | | | |
|---|---|---|---|
| EP58955 | 9/1982 | European Pat. Off. | 414/730 |
| EP61153 | 9/1982 | European Pat. Off. | 414/730 |
| 1456434 | 1/1969 | Fed. Rep. of Germany | 414/1 |
| 383586 | 10/1973 | U.S.S.R. | 414/1 |

Primary Examiner—Robert J. Spar
Assistant Examiner—Terrance L. Siemens
Attorney, Agent, or Firm—Pollock, Vande Sande and Priddy

[57] ABSTRACT

An industrial robot of the type comprising a frame mounted for rotation about a horizontal axis and having a pivot arm which is pivotally attached to the frame for pivotally supporting a boom, is provided with a counterbalancing device for equalizing the weight of the boom. The counterbalancing device includes a toggle lever mounted for pivotal motion about a fixed horizontal axis that extends at right angles to the axis of rotation of the frame, a counterweight or piston being connected to the toggle lever at a point spaced from one side of the pivot axis of the toggle lever, and a linkage connecting a second point on the toggle lever, located on the other side of its pivot axis, to the pivot arm at a location that is spaced from the pivot axis between the pivot arm and frame.

12 Claims, 5 Drawing Figures

APPARATUS FOR WEIGHT BALANCING AN INDUSTRIAL ROBOT

The invention concerns an apparatus for weight balancing an industrial robot of the type having at least one pivot arm, e.g. two pivot arms each of which is pivotably anchored to a frame at a pivot axis. The pivot arm (or arms) pivotably supports a boom which can be rotated on an essentially horizontal axis.

To balance industrial robots, whose frame is rotatable on a vertical axis, it is known to extend each pivot arm beyond its own pivot axis. To this extension, or its actuator, a counterbalance is applied by a counterbalancing device, the device being anchored to the frame. In this way, it is possible to equalize the weight of the boom and, in some instances, the weight that is carried by the boom.

If, however, an industrial robot is operated in a position in which the frame is rotatable about a horizontal axis, for example when the robot is attached to a vertical wall, then such a weight balancing arrangement is no longer effective. This basically presents two extreme cases. In one case, the boom points almost vertically downwards and the two pivot arms run essentially horizontally. In such a case, the weight of the downpointing boom and the two pivot arms is to be equalized. This weight generates a first torque about axis of one pivot arm. The second extreme case occurs when, from the above-mentioned position, the frame is rotated 90° on the horizontal axis so that the boom and the two pivot arms extend somewhat horizontally. The weight of the boom and pivot arms effects a second torque around the axis of the frame; that is, without counterbalance, the robot would attempt to go to the previously described position by rotating about the axis of the frame, by which the boom would again be pointing almost vertically downwards. These torque forces vary according to how far the boom is extended or retracted; in addition, they are also dependent on each intermediate position of the boom on the horizontal axis.

The problem exists of equalizing the weight of the boom and the two pivot arms, and, in some cases, the weight carried by the boom, when the axis of the frame runs essentially horizontally.

This problem is solved by the present invention.

Figure 2:
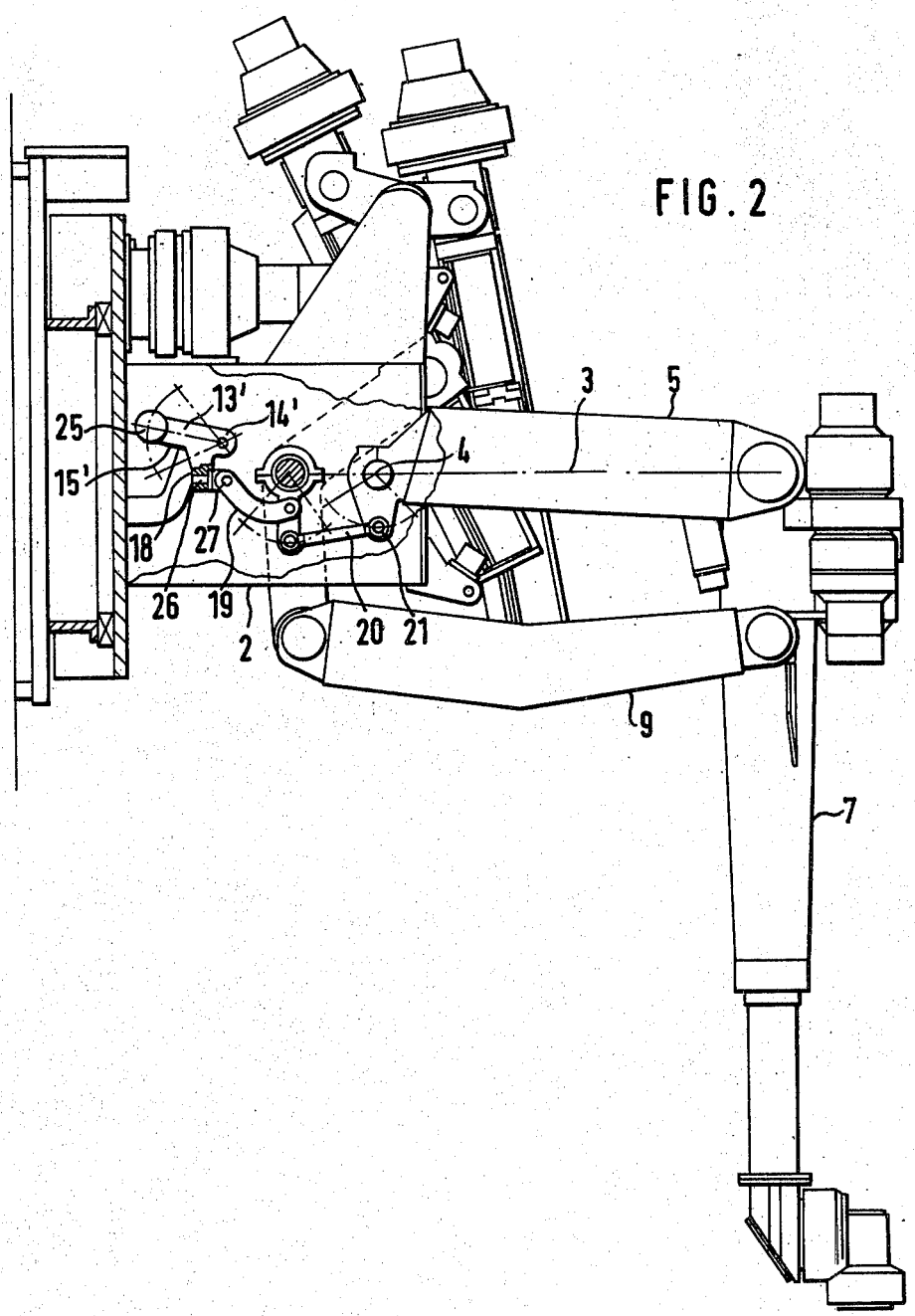
Figure 3:
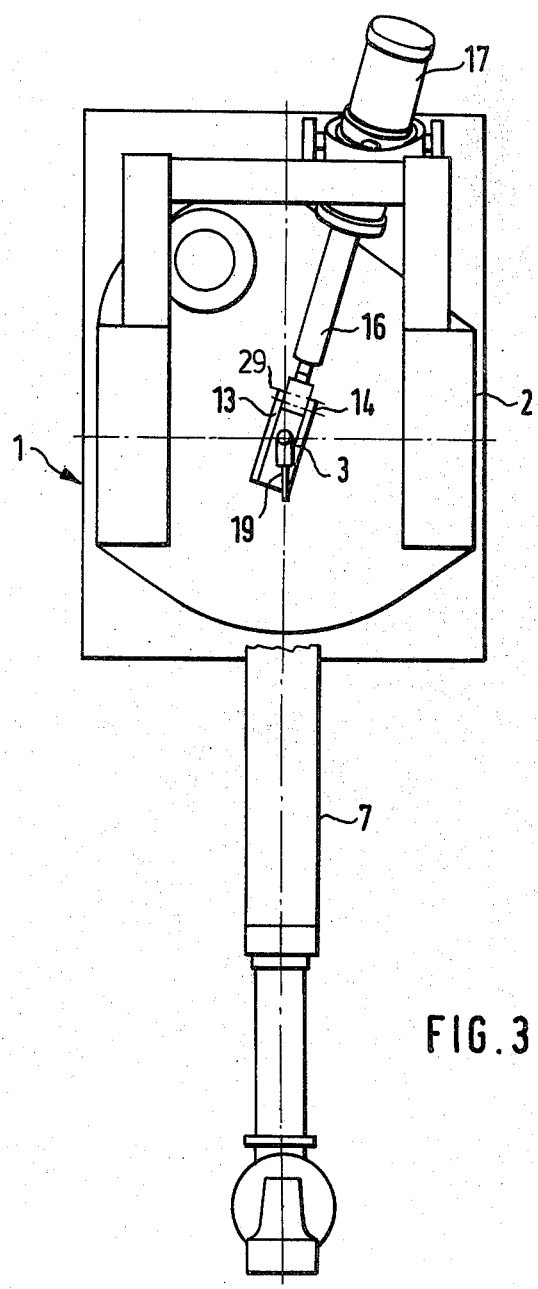
Figure 4:
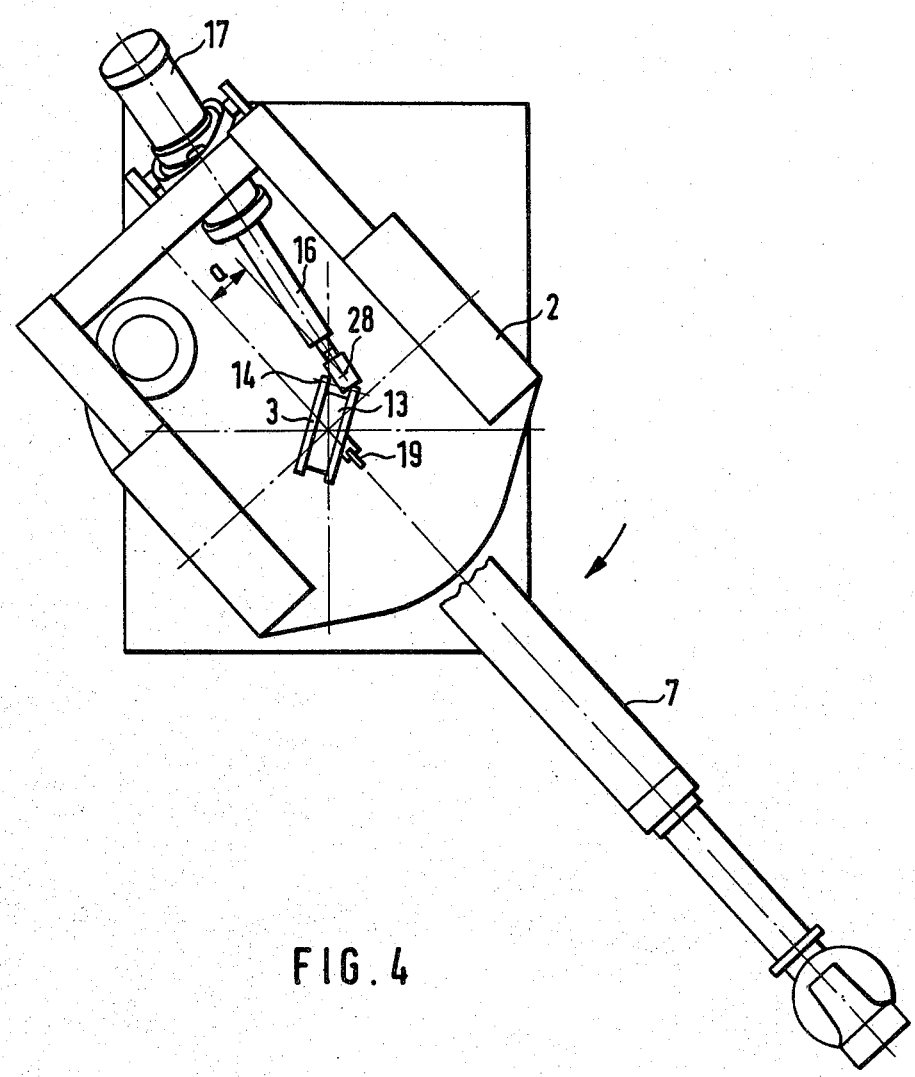
Figure 5:
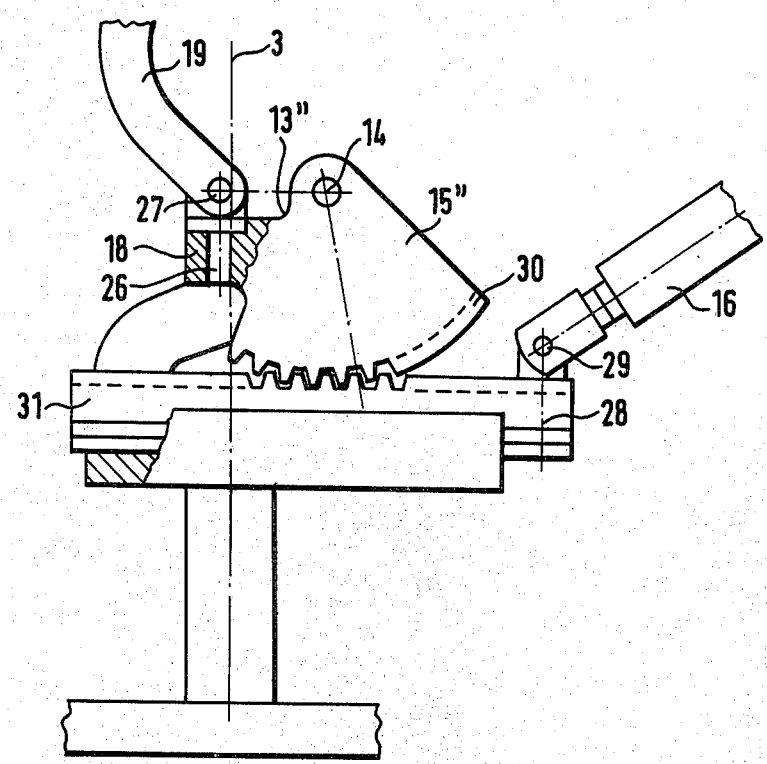

Various embodiments are described by way of the drawings. Shown are:

FIG. 1—a side view of a first embodiment.
FIG. 2—a side view of a second embodiment.
FIG. 3—a section along line A—A in FIG. 1 in a position where the boom is pointing down.
FIG. 4—a section according to FIG. 3 in which the frame is turned about 45° to the right on its axis.
FIG. 5—a variation of the embodiment of FIG. 1.

The robot shown in FIG. 1 is attached to a vertical wall 1. Its frame 2 is turnable on a horizontal axis 3. A first pivot arm 5 is pivotably attached to frame 2 at pivot axis 4. This pivot arm 5 supports boom 7 at axis 6. At axis 8, another pivot arm 9 is connected to boom 7. Arm 9 is connected to a further pivot arm 11 at axis 10. Arm 11 is rotatably attached to frame 2 at axis 12. Axes 4, 6, 8, 10 and 12 are all parallel to one another.

This construction is essentially well-known.

In FIG. 1, the weight of boom 7 and pivot arms 5, 9 effects a first clockwise torque around axis 4. This first torque is what is to be equalized.

To achieve this, a toggle lever 13 is used, which can be pivoted around a stationary horizontal axis 14. On one lever arm 15 of this toggle lever 13, a piston rod 16 of cylinder 17 is attached, cylinder 17 being attached to the frame 2. A pivot lever 19 is attached to the arm 18 of the toggle lever 13. This pivot lever 19 is also attached to the linking lever 23 and can be turned around axis 22. Linking lever 23 can itself be turned around axis 12 of the further pivot arm 11. A further pivot lever 20 is pivotable around an axis 24 at linking lever 23, and is also pivotable about axis 21 at pivot arm 5. The axis 21 runs parallel to and at a distance from axis 4 of pivot arm 5.

When pressure is exerted by cylinder 17, this pressure acts via toggle lever 13, pivot lever 19, linking lever 23 and further pivot lever 20 against the torque, exerted by the weight of boom 7 and pivot arms 5 and 9, in that pivot lever 20 exerts a countertorque on arm 5 axis 4.

It is the purpose of linking lever 23 to increase the turning moment of arm 18 of toggle lever 13 in its effect on the turning moment of arm 5.

The specific pivot areas are represented by dotted lines. For each angled position of pivot arms 5, 9 around axis 4, torque effected by the weight of arms 5, 9 and boom 7 can be equalized by a countertorque also around axis 4.

In the positions in FIG. 1. and FIG. 3, neither cylinder 17 nor the weights from boom 7 and pivot arms 5, 9 cause torque around axis 3.

When frame 2 is turned 90° about axis 3, then the weight from boom 7 and pivot arms 5, 9 effect torque around axis 3.

By the aforementioned rotation of 90° around axis 3, parts 16, 17, 19, 20, 23 also turn and assume a position which is turned 90° from the position shown in FIG. 1 and and FIG. 3. Toggle lever 13 remains, however, in the same position shown in FIGS. 1 and 3.

FIG. 4 shows an intermediate position, in which frame 2 is turned about 45° around axis 3 from the position shown in FIG. 3. The weight of boom 7 now generates a clockwise torque around axis 3. This is indicated by an arrow. Piston rod 16, which in the positions in FIGS. 1 and 3 was directed towards axis 3, is, because of the aforementioned rotation of frame 2, then connected to toggle lever 13 at distance a. Because of the now eccentric connection of piston rod 16, cylinder 17 now generates torque on frame 2 about axis 3, which, in a counter-clockwise motion, counters the torque generated by boom 7.

When boom 7 is rotated 90°, around axis 3 from the position shown in FIG. 3 the aforementioned weight of boom 7 and pivot arms 5, 9 no longer generates a torque on axis 4. In the same way, cylinder 17 no longer generates torque around axis 4. The torque effected by cylinder 17 only works in a counter-clockwise motion on axis 3.

On the contrary, in the intermediate position shown in FIG. 4, cylinder 17 causes torque around axis 4 as well as around axis 3.

The weight equalization is also dependent upon the distance of boom 7 to axis 3. The aforementioned weight equalization arrangement is effective in every position of boom 7 relative to axis 3.

So that pivot arm 19 can be turned in relation to toggle lever 13, it is turnable about axis 26, which runs at a right angle to axis 14 and essentially coaxial to axis 3. This pivot arm 19 is also rotatable about axis 27. Axis 27 runs parallel to axes 22, 24, 21.

In the same manner, piston rod 16 must be turnable relative to toggle lever 13. Piston rod 16 is turnable towards toggle lever 13, around axis 28, which runs at right angles to axis 14 and can be turned about axis 29, which runs at a right angle to axis 28. Instead of using axes 26, 27, and axes 28, 29, pivot lever 19 and piston rod 16 can be connected to toggle lever 13 via ball and socket joints.

A further possibility of power transfer from piston rod 16 to the toggle lever and therefore to the pivot lever part 19, is shown in FIG. 5. Toggle lever 13'' again has a fixed axis 14, which, relative to frame 2, is stationary. Arm 15'' of toggle lever 13'' has a gear 30, which interlocks with a gear rack 31, which can be shifted to a right angle to the axis 3. Connected onto gear rack 31 is piston rod 16 which can be rotated, in one way, about axis 28 and is pivotable to gear rack 31 about axis 29.

The method of operation in FIG. 5 is the same as described in connection with FIGS. 1, 3 and 4.

In the embodiment of FIG. 2, the toggle lever 13' is supported by frame 2 and turnable about axis 14'. The frame 2 is turnable about axis 3. Arm 15' of toggle lever 13' is not connected to a piston rod of a cylinder but supports a counterweight 25. The remaining parts of this embodiment are the same as that of FIG. 1. In the position shown in FIG. 2, counterweight 25 exerts a torque about axis 4, which counters the torque about this axis that is generated by the weight of boom 7 and pivot arms 5, 9. When frame 2 is turned about the axis 3 from the position shown in FIG. 2, the toggle lever 13' with axis 14' is turned together with the frame 2 about axis 3. With increased turning of frame 2, the weight 25 generates an increasing counter torque about axis 3 to the torque that is generated about axis 3 by the weight of boom 7 and pivot arms 5, 9 because the horizontal distance between the weight 25 and the axis 3 increases.

I claim:

1. In an industrial robot of the type comprising a frame mounted for rotation about a horizontal first axis, a pivot arm one end of which is pivotally attached to said frame for pivotal movement relative to said frame about a second axis extending transverse to said first axis, the other end of said pivot arm being pivotally attached to a boom at a third axis which extends parallel to said second axis, and a counterbalancing device is provided for equalizing the weight of said boom as the position of said boom is varied, the improvement wherein said counterbalancing device comprises a toggle lever mounted for pivotal motion about a fixed horizontal fourth axis that extends at right angles to said horizontal first axis, means for applying a counterbalancing force to said toggle lever at a first point thereon which is spaced from said first and fourth axes, and a linkage interconnecting said toggle lever to said pivot arm, one end of said linkage being pivotally connected to said toggle lever at a second point thereon which is located on the other side of said fourth axis relative to said first point, the other end of said linkage being pivotally connected to said pivot arm at a fifth axis which is parallel to and spaced from said second axis.

2. The structure of claim 1 wherein said means for applying a counterbalancing force comprises a counterweight which is connected to said toggle lever at said first point.

3. The structure of claim 1 wherein said means for applying a counterbalancing force comprises a pressure cylinder having a piston arm which is connected to said toggle lever at said first point.

4. The structure of claim 3 wherein said piston arm is connected to said toggle lever via a ball and socket joint.

5. The structure of claim 1 wherein said one end of said linkage is connected to said toggle lever for pivotal motion about a sixth axis which extends at right angles to said fourth axis, said one end of said linkage also being mounted for pivotal motion about a seventh axis which is parallel to said second axis.

6. The structure of claim 5 wherein said sixth axis is substantially coincident with said horizontal first axis.

7. The structure of claim 5 wherein said one end of said linkage is connected to said toggle lever via a ball and socket joint.

8. The structure of claim 5 wherein said means for applying a counterbalancing force to said toggle lever is pivotally connected to said first point for pivotal motion about an eighth axis which is at right angles to said fourth axis, and for pivotal motion about a ninth axis which extends at right angles to said eighth axis.

9. The structure of claim 8 wherein said linkage includes a lever arm one end of which is mounted for pivotal movement about a tenth axis which is parallel to and spaced from said second axis, said linkage further including a first link which extends between said second point on said toggle lever and an eleventh pivot axis located on said lever arm, said eleventh axis being parallel to and spaced from said tenth axis, and a second link one end of which is pivotally attached to a twelfth pivot axis which is located on said lever arm and extends parallel to said tenth and eleventh axes, the other end of said second link being connected to said fifth axis, said eleventh axis being located between said tenth and twelfth axes.

10. The structure of claim 9 wherein said eleventh axis is closer to said tenth axis than it is to said twelfth axis.

11. The structure of claim 9 wherein said industrial robot includes a further pivot arm one end of which is pivotally connected to said boom at a pivot point thereon spaced from said third axis, the other end of said further pivot arm being connected for pivotal movement about said tenth axis.

12. The structure of claim 1 wherein said means for applying a counterbalancing force to said toggle lever is connected to said toggle lever via a movable gear which can be rotated about an axis that is disposed at right angles to said horizontal first axis, said gear meshing with a gear rack carried by said toggle lever.

* * * * *